Aug. 31, 1937. R. L. TEMPLIN 2,091,534
DEFORMATION RECORDING APPARATUS
Filed Aug. 4, 1932 2 Sheets-Sheet 1

INVENTORS
RICHARD L. TEMPLIN
BY
ATTORNEY

Aug. 31, 1937.   R. L. TEMPLIN   2,091,534
DEFORMATION RECORDING APPARATUS
Filed Aug. 4, 1932   2 Sheets-Sheet 2

INVENTORS
RICHARD L. TEMPLIN
BY
ATTORNEY

Patented Aug. 31, 1937

2,091,534

UNITED STATES PATENT OFFICE 2,091,534

DEFORMATION RECORDING APPARATUS

Richard L. Templin, New Kensington, Pa.

Application August 4, 1932, Serial No. 627,454

10 Claims. (Cl. 265—2)

This invention relates to apparatus for making and recording physical tests. It relates especially to apparatus for measuring the deformation of specimens of structural materials, both metallic and non-metallic, such as rods, sheets, wires, and the like, and for making stress-strain records of tests of such materials.

Some of the more modern methods of determining the stress-strain or load-deformation relationship of metals or other structural materials can be employed to much better advantage with deformation-measuring apparatus which is faster and more accurate than the apparatus which has generally been available at reasonable cost for this purpose in the past. This is particularly true in the testing of materials which do not have "yield points" in the meaning of that term as applied to hot rolled mild steel.

It is generally conceded that the ideal instrument for this purpose should have a magnification ratio of at least 250, and preferably of 500 to 1000 or more, and in accuracy and sensitivity it should be at least equal to the better extensometers now available. It should be able to repeat within close limits, and is particularly applicable to record deformations increasing in one direction. The instrument should be capable of rapid attachment to and detachment from test specimens which range in size from small wires and thin sheets to the larger structural test specimens now frequently used, and in the case of the smaller specimens, at least, the part of the instrument which is attached to and supported by the specimen should be as light as possible. Since the apparatus is to be used in routine commercial tests it must be rugged and easy to manipulate, and so designed as to permit its proper functioning in rapidly performed tests. The personal equation of the operation should be reduced to a minimum. The apparatus should be adapted to use with existing testing machines, and its cost should be reasonable.

An object of the present invention is to provide a recording instrument and system having the desirable characteristics enumerated hereinabove.

Another object of the invention is to provide an automatic recording or autographic extensometer which is economical in construction, simple in operation, and adaptable to a wide variety of testing conditions.

The invention has for further objects such other operative advantages and results as are found to obtain in the apparatus in so far as the scope of the subject matter thereof is claimed herein, it being understood as hereinafter set forth that the specific subject matter disclosed herein, involving for example, the selsyn motors and reversal of recorder operation in accordance with increases and decreases in strain, is the joint invention of myself and Donald I. Bohn, as set forth in our joint application Serial No. 711,617, filed February 16, 1934. By virtue of myself being one of said inventors, I have used herein the disclosure of said application as illustrative of the broad phases constituting my sole invention.

Most commercial testing machines are, or can easily be, provided with a recording drum, or with a dial or other equivalent, and a pencil or stylus which, while in contact with the drum, is moved parallel to the axis of the drum through a distance proportional to the load applied to the specimen, or in other words, proportional to the stress thereon. If, then, some means is provided for rotating the drum through an arc which is proportional to the deformation or strain of a specified length of the test specimen, the basis for a recording system is at hand. This fact has been recognized in the past, but in developing an operative instrument from this basis difficulties have always been encountered. As a result, instruments previously developed have had a magnification ratio which is too low, or have been too slow, or too inaccurate, or too heavy, or too expensive to be generally satisfactory for the wide variety of conditions encountered.

One of the principal difficulties encountered in the past has been that the power required to rotate the recording drum and control its movement with sensitivity and accuracy is large in comparison with the forces available in any unit or element of the recording system which can be attached to the test specimen without interfering with the accuracy of the test. This attached unit should be very light in weight, as previously indicated. It is therefore necessary to provide an auxiliary source of power for operating the drum, and this source must be controlled accurately and without time lag by the deformation occurring in the test specimen. An improved apparatus for rotating a recording drum or the like proportionately to the strain of the test specimen is described hereinbelow, and this improvement overcomes many of the difficulties previously encountered in attempting to construct apparatus suitable for use in rapid and accurate tests. In the improved system magnification ratios up to 16,000 or more can be obtained without sacrificing accuracy, and the results obtained at high and low magnification ratios can be consistently duplicated.

Tensile tests are usually made with specimens having a gage length of 2 inches, 8 inches or some other preselected distance which is generally greater than the unit length and throughout which the deformation is to be determined. Deformation measured over this gage length gives the first multiplication factor or amplification of the unit deformation, and in the case of a gage length of 2 inches, this factor is 2. Experience has shown that a single mechanical lever with a multiplication ratio up to about 5:1 is generally more satisfactory and dependable than lever systems with higher ratios for use in strain-following and measuring devices. Accordingly I prefer to employ a bell-crank lever giving an amplification of 5 as the strain-following element in the system. This makes the total amplification thus far obtained 10:1, if a specimen of 2" gage length is employed. With specimens of greater gage length, the total amplification is of course greater.

At about this point in the amplifying system I have found it convenient to change from a nominal linear motion to rotation, which is the motion of the recording drum. I have found that this may be readily accomplished by means of a fine threaded lead screw passing through a threaded bushing in the control unit or clip in which the strain-following bell-crank lever is mounted. This screw and the lever form parts of an electric circuit arranged to control the force which operates the recording drum.

If the lead screw has 50 threads to the inch, one revolution of the screw results in a linear motion of 0.02", and if used with the 10:1 amplification previously obtained, one revolution of the lead screw is equivalent to a unit deformation of 0.002". For a total magnification ratio of 500:1, the periphery of the recording drum or the chart attached thereto must rotate 1" for each revolution of the lead screw; for a total ratio of 1000:1 the drum must rotate 2" for each revolution of the screw, etc. A drum and chart having a circumference of 10" must then turn through $\frac{1}{10}$ of a revolution to give a total amplification of 500:1, or through $\frac{1}{5}$ of a revolution to give a total amplification of 1000:1 under these conditions. For drums with larger circumferences a smaller fraction of a complete revolution would be required to give the same amplification, or greater amplification would be obtained with the same amount of rotation.

The desired rotation of the recording drum is readily provided for by a suitable arrangement of gears and motive means. For example, a large driven gear is mounted on the shaft of the recording drum, preferably with a friction-gripping or spring-loaded hub, so that the gear may be turned independently of the shaft and the drum. One or more smaller driving gears, having the desired ratio or ratios to the large driven gear, are mounted on another shaft in position to mesh with the driven gear, and the rotation of these smaller gears is accurately synchronized with the rotation of the lead screw. This synchronization is preferably accomplished by the use of two self-synchronizing motors, such as those which are commonly referred to as "selsyns", which term will be employed hereinbelow. One selsyn serves as a generator or transmitter and is connected to the shaft on which the small driving gears are mounted, while the other selsyn serves as a motor or receiver and is connected to the lead screw in the control unit by means of a suitable coupling member. When current is applied the selsyns are automatically synchronized and rotation of the small driving gears and the selsyn transmitter, which are attached to a common shaft, is exactly reproduced by the selsyn receiver, and by the lead screw if it is directly connected with the receiver.

The shaft to which the selsyn generator and the driving gears for the recording drum are attached is preferably driven by a small auxiliary motor so arranged that its operation is controlled by the circuit including the lead screw and the strain-following element. The operation and effect of the auxiliary motor and the control circuit will be described in more detail hereinbelow. This preferred synchronizing and control system is also described and claimed in a copending application, Serial No. 711,617, filed February 16, 1934. One of the numerous advantages of such a system is that the control unit is adapted to include only essentially fundamental parts and hence is very light in weight with the result that it may not only be entirely supported by the specimen but may also determine the gauge length when so attached without possibility of introducing error due to excessive weight of the unit. I have found that a control unit or clip for use with test specimens of 2" gage length need weigh only about two ounces, and that a unit of this weight gives satisfactory results, even after several months of almost continuous use.

In order that the nature and advantages of the invention may be more readily understood, it will now be described with reference to the accompanying drawings in which.

Figure 3:
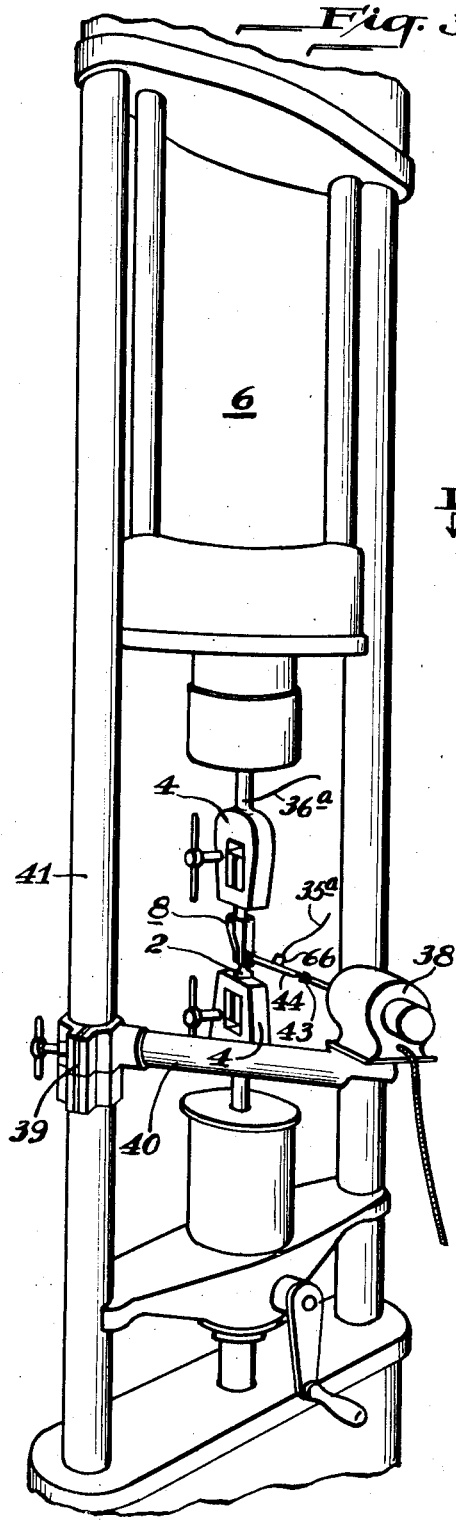
Fig. 3 is an elevational view of a testing machine with a test specimen mounted therein and a control unit or frame attached to the specimen.

In performing and recording a tensile test, for example, with my improved apparatus, a test specimen 2 which may be of round, rectangular or other suitable cross section, is gripped between the jaws of shackles 4, 4 of a testing machine 6, shown in Fig. 3. The testing machine may be of any type adapted to apply tensile stress to the specimen, and the shackles 4 may also be of any suitable type, but I prefer to employ shackles of the type described in the application of R. L. Templin, Serial No. 481,612, now Patent No. 1,872,047. The test specimen may be of any desired gage length, but it will be assumed to be of 2" gage length, which is commonly used, especially in tests of the standard ½" diameter or ½" width specimens of metals, and in tests of smaller rods and specimens.

When the specimen is clamped firmly in the shackles of the testing machine, a control unit or clip 8 in the form of a frame bearing a strain-following element is attached thereto. If straight, carefully-prepared specimens are gripped in shackles of the preferred type with self-aligning grips, it is only necessary to measure the strain on one side or element of the specimen. This known fact is applied in the present system, in which only one strain-following element 10 is employed in the control unit 8. This strain-following element preferably takes the form of a bell-crank lever with a multiplication factor of about 5, as previously stated, although levers with other multiplication factors may obviously be used. The lever 10 is provided at one end with a knife edge or point 11, as shown most clearly in Fig. 4, and this point contacts the test specimen 2 and moves in accordance with the strain thereof. At the other end the lever is provided with a contact button 12 adapted to contact with a lead screw. The lever is mounted on a pivot 14 between the side walls of one section of the control unit or frame 8, and is preferably in electric conducting relationship with the walls of the clip or frame, although it may be insulated therefrom.

Figure 5:
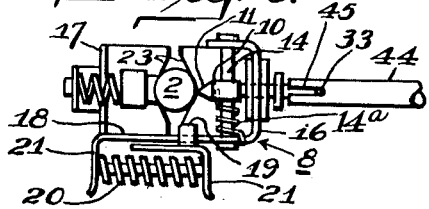
Fig. 5 is a horizontal sectional view taken along the line V—V in Fig. 4.

The clip or control unit 8 consists of two sections 16 and 17 which are relatively movable, as shown most clearly in Fig. 5, as by moving a portion 18 of the side wall of section 16 longitudinally through a slot or channel 19 provided in the wall of the other section 17. The two sections are normally drawn together and held there resiliently by the expansion of a spring 20 mounted between handles or grips 21, 21, each of which is attached to one section of the control unit, and the sections may be separated by pressing these grips together and thereby compressing the spring 20.

At or near the bottom of each section is a knife edge 23, which is preferably V-shaped or curved and tapers from both ends toward the center so that specimens of varying shape can be gripped securely and centered automatically in the clip. The section 17 is of resilient construction, and is provided at its upper end with a pad or buffer 25 of rubber, fiber, or the like which is in yielding contact with the specimen at a point opposite from its point of contact with the pointed end 11 of the bell-crank lever 10. When the grips 21, 21 are pressed together, the knife edges of the sections 16 and 17 are separated sufficiently to allow the control unit to slide easily onto the specimen 2, and when the grips are released the unit is held firmly in place on the specimen which is gripped between the knife edges 23, 23 at the lower end of the unit, and between the pad 25 and the point 11 at its upper end. The control unit may be readily and almost instantaneously removed at any time by simply pressing the grips 21, 21 together again. In this sense, the control unit is normally adapted to be readily removed from a specimen or attached thereto during which operations the control unit is freely movable with respect to the recorder element and the actuating means therefor.

Referring again to Fig. 4, a set screw or stop 27 is provided in the end wall of section 16 of the control unit, and a small spring 14a or the like is preferably provided on the pivot 14 adapted to hold the lever 10 against the stop 27 when the lever is in its initial position. The stop is so adjusted that when the unit 8 is attached to a specimen the point or edge 11 will be in proper alignment with the knife edge 23, and the distance between the point 11 and the edge 23 when the lever 10 is against the stop 27 is the predetermined gage length, such as 2 inches. It will now be clearly understood that as the specimen 2 is extended by the force or load applied during the test, the point 11 will move upward a distance equal to the total deformation of the 2 inch (or other) gage length; that the lever 10 will rotate about the pivot 14; that if the multiplication factor of the lever is 5, the movement of the button 12 will be ten times the unit deformation.

An internally threaded bushing 28 is also mounted in the end wall of section 16 of the control unit, and is preferably electrically insulated therefrom by a tube and washer or other suitable arrangement of insulating material 29. Screwed into the bushing 28 is a finely threaded lead screw 30, provided at its inner end with a spherical or conical shaped contact tip 31 adapted to contact the button 12 on lever 10 to close an electric circuit. At its outer end the lead screw terminates in a ball 32 provided with small studs 33, or in other suitable means for forming a sliding coupled joint.

An insulated wire 35 is attached to the bushing 28 or directly to the lead screw 30, and another wire 36 is connected directly or indirectly to the lever 10. These two wires form a part of the electric circuit which controls the recording mechanism as will be described more fully hereinbelow, and they constitute the only connection between the control unit 8 or the strain-following element 10 and the recording mechanism proper. In a preferred arrangement of this circuit, the wires 35 and 36 are not attached directly to the control unit 8, but are connected to other parts of the system which are in electric conducting relationship with the lead screw 30 and the lever 10, respectively, as will be described hereinbelow.

As shown in Fig. 3, a selsyn motor or receiver 38 is adjustably mounted near the test specimen 2 and the control unit 8, as by means of suitable clamps 39 and support 40 attached to a post or column 41 forming a part of the testing machine 6 or located conveniently adjacent thereto. The shaft of the motor 38 is connected through a suitable universal joint 43, which preferably is composed of or contains insulating material, to a light-weight coupling member 44, which may suitably be a tube provided at its outer end with slots 45 adapted to engage the studs 33 on the outer terminal 32 of the lead screw 30. When the support 40 is at the proper elevation, the motor 38 is readily swung around so that the coupling member 44 is in alignment with the lead screw 30 and joins easily therewith. The clamp 39 is then tightened to prevent movement of the motor, and any relative movement of the motor and the control unit that may then occur during the test is taken up by the universal joint 43, which also facilitates the joining of the coupling members. Before starting the test the lead screw 30 is turned back in the bushing until it is well out of contact with the button 12 on the lever 10, and when it is screwed back through the bushing to follow the movement of the lever as the test proceeds, the linear motion of the screw merely causes the studs 33 to slide in the slots 45 in the end of the coupling member 44.

Figure 1:
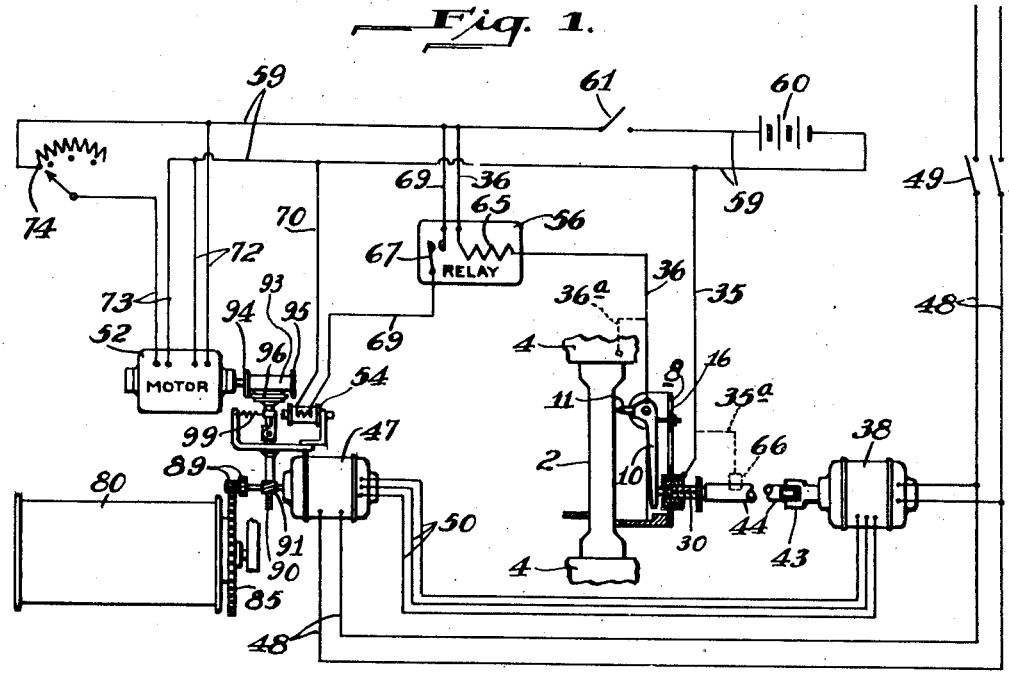
Fig. 1 is a somewhat diagrammatic view of the general arrangement of the apparatus and electrical connections.

Referring particularly to Fig. 1, the selsyn motor 38 and the selsyn generator or transmitter 47 are electrically connected to an excitation circuit 48 controlled by a switch 49. The excitation circuit is preferably connected to a source of 110 volt, 60 cycle, single phase alternating current. The selsyns are connected to each other by synchronizing lead wires 50. An auxiliary motor 52, an electromagnet 54, and a relay 56, are connected to an auxiliary circuit 59 which is energized by a battery 60 and controlled by a switch 61. If an alternating current motor and alternating current windings for the magnet and relay are used, the battery 60 may be omitted and the auxiliary circuit 59 can then be connected to the excitation circuit 48 or some other suitable supply of alternating current.

Figure 4:
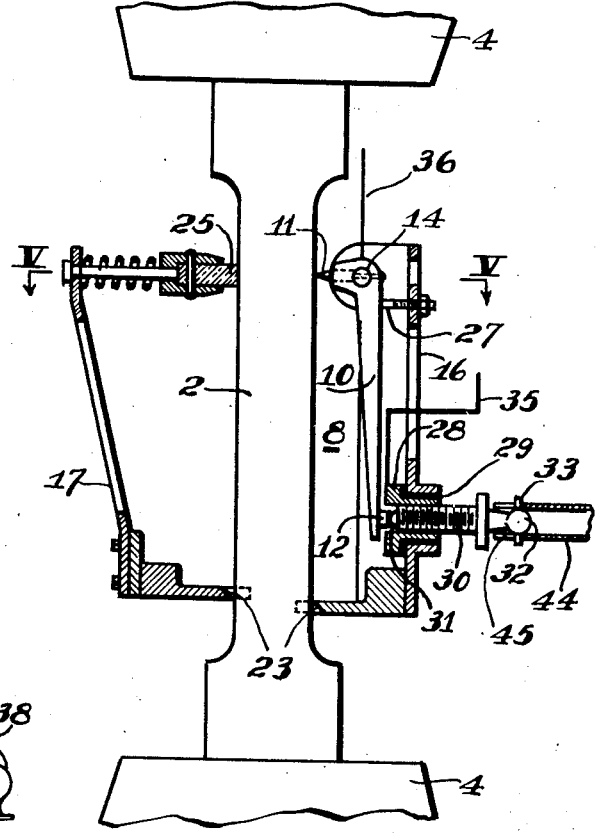
Fig. 4 is an enlarged vertical sectional view of the control unit mounted on the test specimen.

The primary or energizing circuit of the relay 56 comprises a wire or conductor 35 which connects the lead screw 30 with one side of the circuit 59, and a wire 36 which connects the bellcrank lever 10 with the other side of the circuit 59, and includes a high resistance coil 65 for the relay 56. This coil might obviously be connected with the wire 35 instead of with wire 36 with entirely similar results. Instead of the direct connections of wire 35 to the bushing 28 or the lead screw 30, and of wire 36 to the lever 10 or the wall of the control unit 8, as shown in Fig. 4 and Fig. 1, these connections may be omitted and indirect connections may be substituted therefor. For example, the wire 36 may be connected by means of a wire 36a with one of the shackles 4 or some other part of the testing machine which is in electric conducting relationship with the specimen 2 and thence with the lever 10, and the wire 35 may be connected by means of a wire 35a and a brush 66 or other suitable contacting means with the coupling member 44, which in turn is in contact with the lead screw 30, as shown in Figs. 1 and 3. The lever 10 and screw 30 are insulated from each other by the insulation 29 around the bushing 28 or by suitable insulation of the pivot 14, and the coupling member 44 is insulated from the motor 38 and the rest of the system by the insulating universal joint 43, for example. With his modification there is no permanent connection between the control unit 8 and the rest of the system, and no wires need be attached to the control unit.

The primary relay circuit is closed when the lead screw 30 contacts lever 10, and if the switch 61 is closed at the time, the relay coil 65 is then energized. This coil is highly sensitive and very little current is required to energize it sufficiently to close the relay switch 67 in the secondary or working circuit. A small amount of current in this primary circuit is desirable, as it minimizes pitting and corrosion of the contact members on the screw 30 and the lever 10.

The secondary relay circuit comprises wires 69 and 70 connected respectively to opposite sides of the circuit 59, an electromagnet 54, and the relay switch 67. The magnet 54 is therefore energized by the battery 60 when the switch 67 is closed.

The auxiliary motor 52 is provided with a branch circuit 72 connected to the field and a branch circuit 73 connected to the armature. Each branch circuit is connected to the opposite sides of the circuit 59 and the armature circuit 73 may include a rheostat 74 for controlling the speed of the motor. This rheostat may be omitted, however, as entirely satisfactory results are obtained when the motor 52 is operated at full or constant speed.

Figure 2:
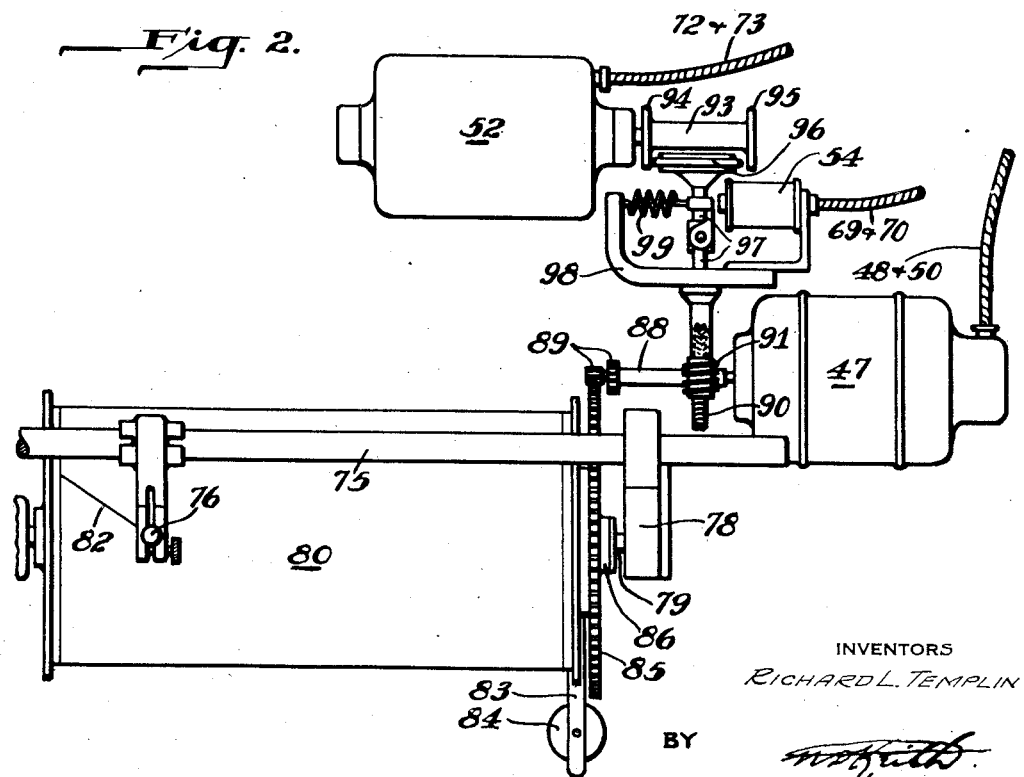
Fig. 2 is an enlarged plan view of the preferred type of recording unit and auxiliary apparatus.

The recording instrument assembly, shown in more detail in Fig. 2, has no mechanical connection with the testing machine proper or the control unit 8, and may be set up at any desired distance therefrom. As a matter of convenience, however, this assembly is generally located near the loading element or other device by means of which a load is applied to the testing machine and the test specimen mounted therein. When so located, a rod or tube 75 bearing a pencil or stylus 76 and slidably mounted in a suitable bearing in a frame member 78, may readily be so connected with the loading device, in known manner, that the longitudinal movement of the rod 75 is directly proportional to the load applied to the test specimen.

Near the rod 75 and journalled at one end in the frame member 78 or a member adjacent thereto is a shaft 79 on which a recording drum 80 is keyed or otherwise attached. A paper chart or recording sheet may be suitably attached around the periphery of the drum, which is so located that the stylus 76 may be lowered into contact with the drum or the chart thereon. When the rod 75 and the stylus 76 are then moved longitudinally in proportion to the load applied during a test, and the drum 80 is rotated through an arc proportional to the resulting deformation of the specimen, a curve 82 is drawn, which constitutes a load-deformation or stress-strain record of the test.

A brake 83, such as a rod or plate bearing against a flange at one end of the drum, may be applied and set by a thumb nut 84 or other suitable means to prevent rotation of the shaft 79 and drum 80. A gear 85 is mounted on the shaft 79 at one end of the drum 80 by means of a spring-loaded hub 86 or other suitable device whereby rotation of the gear causes the shaft and drum to rotate when the brake 83 is released, but the gear is allowed to rotate on the shaft without turning the drum when the brake is applied.

Mounted near the recording drum 80 is the selsyn generator or transmitter 47 provided with an elongated shaft 88. Keyed to this shaft are one or more small gears 89 adapted to engage the gear 85, and a gear 90 in operative engagement with a worm gear 91. The auxiliary or driving motor 52 is also located near at hand, preferably with its shaft 93 parallel with the shaft 88, and provided with two driving discs 94 and 95. Between these discs is a driven disc or reversing disc 96 adapted to contact with either of the driving discs and mounted on one end of a partially flexible shaft 97. The worm gear 91 is firmly attached to the other end of the shaft 97 and rotates therewith.

The shaft is supported in a suitable bearing in or attached to a frame member 98 which also supports the magnet 54 and is attached to one end of a spring 99. The other end of the spring 99 is attached to a collar or the like on the shaft 97, and the spring normally holds the reversing disc 96 against the driving disc 94. When the magnet 54 is energized, however, the reversing disc is pulled over against the tension of the spring 99 into contact with the driving disc 95, and the direction of rotation of the shaft 97 and the worm gear 91 is thereby reversed. This, of course, reverses the rotation of shaft 88, and the gear 85 and the selsyn generator 47 driven therefrom.

*Operation*

The procedure of making a record and test with the improved system will now be readily understood. A test specimen 2 is inserted between the shackles 4 of a testing machine 6 and gripped firmly thereby. The control unit 8 is then attached to the specimen with the point 11 of the lever 10 substantially perpendicular to the surface of the specimen and the lead screw 30 withdrawn into the bushing 28. The selsyn motor 38 is swung into position and coupled with the lead screw by means of the coupling member 44. The switch 49 in the excitation circuit 48 is closed, thereby synchronizing the selsyn motor 38 with the selsyn generator 47. The brake 83 is applied to the recording drum 80, on which a blank chart has been placed.

The switch 61 in circuit 59 is then closed, starting the auxiliary motor 52. The spring 99 holds the reversing disc 96 against the driving disc 94, and the worm gear 91, the shaft 88, the gear 85, and the selsyn generator 47 are driven in a positive direction, while the drum 80 remains stationary. The selsyn motor 38 revolves exactly the same amount as the selsyn generator 47 with which it is synchronized, and in so doing turns the lead screw 30 into and through the bushing 28.

This positive rotation continues until the contact tip 31 on the lead screw 30 touches the contact button 12 on the lever 10. When this happens the primary circuit through the sensitive relay 56 is closed and the relay coil 65 is energized, closing the switch 67 in the secondary circuit. The magnet 54 is then energized and pulls the reversing disc into contact with the driving disc 95, reversing the rotation of the worm gear 91 and the other apparatus driven and controlled thereby. This reverse rotation causes the lead screw 30 to back away from the lever 10, thereby opening the primary relay circuit and deenergizing the coil 65. This permits the switch 67 to open, deenergizing the secondary circuit and the magnet 54. The spring 99 then returns the disc 96 to its normal position in contact with the disc 94, and positive rotation is resumed.

As soon as the contact 31 on the lead screw first comes into contact with the button 12, the preliminary steps are completed and the test proper can be started. These preliminary steps actually require but a few seconds for completion—usually not more than a minute. The stylus 76 is then lowered into contact with the recording drum or chart, if this has not been done previously, and the brake 83 is released, permitting the drum 80 to revolve with the gear 85. The load is then applied gradually to the specimen in known manner, and the test and record are under way. The stylus 76 moves longitudinally across the chart a distance proportional to the load applied, and as the specimen is deformed deformation is followed by the point 11 on the lever 10, which rotates about its pivot 14, swinging the button 12 away from the lead screw 30. The positive rotation of the lead screw will then continue until contact with the lever is again established at a point which is continually moving away from the screw, and the positive rotation thus continues through an arc greater than the arc through which reverse rotation is carried in breaking the contact. As a result the recording drum is rotated by small increments with respect to the stylus, and the curve 82 is drawn upon the chart. The reversals are so rapid that the curve is usually substantially smooth, although with some magnification ratios and rates of loading the curve may be slightly serrated.

The test and record may be continued to any desired point—that is, until the load applied exceeds the ultimate strength of the specimen and causes its rupture, or until a lesser load has been applied. It may, for example, be desirable to obtain a stress-strain record up to a point where the yield point of the specimen has been materially exceeded, and also to record the ultimate strength of the specimen. This is done by starting a test and record in the usual way and continuing it until the yield point has been sufficiently passed, then opening the switches 61 and 49, uncoupling the selsyn motor 38 from the lead screw 30, and detaching the clip or unit 8 from the specimen. This is readily and quickly done without interrupting the test, and while the strain record is of course discontinued when the motors are shut off and the drum ceases to revolve, the increase in stress until the specimen is ruptured is recorded as a longitudinal line on the chart. Such records are very instructive.

While the system was designed primarily for tensile tests it performs in a similar and entirely satisfactory manner in compressive tests.

As previously stated, alternating current can be substituted for direct current in the auxiliary circuit 59 with only slight modifications of the rest of the system. A grid-glow tube and amplifying tubes, or other electrical amplifying means, can be substituted for the relay 56 if desired. Another modification comprises the substitution of a reversing switch, controlling the motor 52, for the switch 67 and the magnet 54 controlled thereby in the secondary circuit of the relay 56 or other amplifying device. With this modification, the mechanical reversing mechanism consisting of the driving discs 94 and 95, the reversing disc 96, the spring 99, and the magnet 54 are eliminated, and the worm gear 91 is mounted directly on the shaft of the motor 52.

Almost any desired magnification of the unit deformation can be obtained by proper selection of gage length of the specimen, multiplication factor of the strain-following lever 10, pitch of the threads on the lead screw 30, diameter of the recording drum, and ratio of the gear 85 mounted on the shaft of the recording drum to the gear or gears 89 by which it is driven. A worm and gear may also be inserted between the selsyn motor 38 and the lead screw, and with this arrangement I have employed magnification ratios as high as 16,000:1 with satisfactory results. At these very high magnifications the testing speed (or rate of loading) should be low to obtain the best results, but with more normal magnifications, between 400:1 and 1000:1, for example, satisfactory results are obtained with testing speeds up to 0.3 inch per inch per minute, which include the ranges of good commercial practice.

This application relates to the combination of a control unit capable of attachment to a specimen for defining the gauge length thereof and recording means adapted to be mounted separately and independently of the testing machine with operative connections between the recording means and control unit whereby the recording means is fully and accurately responsive to deformations of a specimen. A joint application of myself and D. I. Bohn, Serial No. 711,617, filed February 16, 1934 relates to certain improvements such as having means for reversely operating the recording means in combination with operative connections between such recording means and a control unit so that the latter controls the recording means in accordance with either increases or decreases in the specimen strain. This joint application also relates to the improvement of having a continuously operating source of power in combination with the foregoing means as well as other features which will be more apparent from the claims of that application.

It will be evident to those skilled in the art that various modifications can be made in the several parts of my apparatus, in addition to those described by way of example hereinabove, without departing from the spirit of my invention, and it is my intention that the claims shall cover such modifications as are included within the scope thereof.

I claim as my invention:

1. Apparatus for recording the progressive deformation of test specimens, comprising recording means, electric actuating means adapted to operate said recording means and supported independently of the specimen, a control unit capable of attachment to the test specimen separately from said actuating means, said control unit containing a strain following member and another movable member adapted to close an electric circuit when in contact with the strain following member, electrically operated means for controlling the operation of said recording means, said electrical controlling means being controlled by said circuit, and means driven by said actuating means and synchronously connecting said recording means to said movable member for controlling said circuit including a flexible connection between said movable member and the remainder of the synchronous connecting means thereby to transmit mechanically the synchronizing action to said movable member.

2. In apparatus for recording the deformation of test specimens, a recording drum fixed to a shaft, a gear with a friction-gripping hub mounted on said shaft, a brake adapted to prevent rotation of the drum, and means to rotate the gear proportionately to the deformation of a test specimen, whereby the recording drum is rotated proportionately to the deformation of the specimen when the brake is released, and the gear is rotated while the drum remains stationary when the brake is applied.

3. In apparatus for recording the deformation of test specimens, recording means, electric actuating means adapted to operate said recording means, means for supporting said recording and actuating means independently of the specimen, an electric circuit adapted to control the operation of the recording means by said actuating means, a strain following element capable of being supported by the specimen independently of said actuating means and recording means, said strain following element being adapted to contact the test specimen so as to be movable proportionately to the deformation thereof, a cooperating threaded element rotatable proportionately to the movement of the strain following element and into contact therewith to close said circuit, and means driven by said actuating means for synchronizing the rotation of said threaded member with the operation of said recording means including a flexible connection between said threaded member and the remainder of the synchronous connecting means thereby to transmit mechanically the synchronizing action to said threaded member.

4. In apparatus for recording the deformation of test specimens, a recorder element, electrically actuated means for rotating said recorder element, said electrically actuated means and element being supported independently of the specimen, a control unit normally adapted to be readily removed from a specimen so as to be freely movable with respect to said recorder element and the actuating means therefor, said unit containing a strain-following member in contact with a test specimen and movable proportionately to the deformation thereof, a threaded member rotatable into contact with said strain-following member to close an electric circuit whereby the rotation of the recorder element is controlled, and means driven by said actuating means for synchronizing the rotation of said threaded member with the rotation of said recorder element including a flexible connection between said threaded member and the remainder of the synchronous connecting means thereby to transmit mechanically said synchronizing movement to said threaded member.

5. A control unit for apparatus for recording the deformation of test specimens, comprising two relatively movable and resiliently-connected sections adapted to grip a test specimen, each of said sections being provided with a knife edge at one end, one of said sections being provided with a resilient pad at the other end, and the other section being provided with a pivoted strain-following member adapted to contact with the test specimen and movable proportionately to the deformation thereof, said other section being also provided with a member movable into contact with the strain-following member to close an electric circuit.

6. In apparatus for recording the progressive deformation of test specimens, recording means, actuating means therefor supported independently of the specimen, a control unit capable of attachment to the test specimen to determine the gauge length thereof and to be entirely supported thereby substantially without affecting the accuracy of the test and freely movable with respect to the recording means when removed from the specimen, said control unit having a strain responsive member and a cooperating movable member, an electric circuit containing said control unit and adapted to have said strain responsive and cooperating members control the operation of said recording means, and means driven by said actuating means and synchronously connecting said recording means to said cooperating movable member including a flexible connection between said cooperating movable member and the remainder of the synchronous connecting means thereby to transmit mechanically the synchronizing action to said movable member.

7. An apparatus for determining the stress-strain characteristics of material comprising a frame adapted to be fastened at predetermined spaced points to a specimen of the material, a bell crank pivoted intermediate its ends to the frame, one end of the bell crank having a needle point engaging the material, and the other end of the bell crank comprising a contact of an electrical contact switch, another contact of the switch comprising a rotatable screw threaded through the frame and insulated therefrom, a separate, independently mounted recording means including a movable member, means for moving said member and said screw in synchronism, and means controlled by the opening and closing of said switch for controlling the operation of said moving means.

8. Apparatus for recording the deformation of a test specimen stressed in a materials testing machine comprising, in combination; recording means adapted to be mounted separately and independently of the testing machine; actuating means effective for operating the recording means and supported independently of the specimen; a control unit having a frame, means for attachment to the specimen so as to support the unit by the specimen and define the gauge length thereof including a strain following element movable in proportion to the deformation of the specimen and a movable electrical element cooperating with said strain following element; said control unit with its frame, attachment means, cooperating electrical element and strain following element constituting a self-contained unitary structure adapted when removed from a specimen to be freely bodily movable as an assembled unit relative to both the recording means and the actuating means; means including an electrical circuit controlled by movement of said strain following element for controlling the operation of the recording means by said actuating means, and means driven by said actuating means and synchronously connecting said recording means to said cooperating movable electrical element for controlling said electrical circuit including a flexible connection between said cooperating movable electrical element and the remainder of the synchronous connecting means thereby to transmit mechanically the synchronizing action to said cooperating electrical element.

9. Apparatus for recording the progressive deformation of a test specimen stressed in a materials testing machine comprising, in combination; recording means adapted to be mounted separately and independently of the testing machine; electric actuating means adapted to operate said recording means and supported independently of the specimen; an electric circuit for controlling the operation of said recording means by said actuating means; a control unit having self-contained means for attachment to the test specimen so as to support the unit by the specimen and define the gauge length thereof including a strain following member and another movable member adapted to control said electric circuit in cooperation with said strain following member; said control unit with its attachment means, strain following member and cooperating movable member constituting a self-contained unitary structure adapted when removed from a specimen to remain as an assembled unit; and means driven by said actuating means and synchronously connecting said recording means to said cooperating movable member for controlling said electric circuit including a flexible connection between said cooperating movable member and the remainder of the synchronous connecting means thereby to transmit mechanically the synchronizing action to said cooperating movable member.

10. An apparatus for recording the deformation of a specimen stressed in a materials testing machine comprising, in combination, a frame adapted to be fastened at predetermined spaced points of the specimen, a lever pivoted to the frame, one portion of the lever having a gauge point engaging the specimen and another portion of the lever having an electrical element, a cooperating movable electrical element, a screw rotatably threaded through said frame for moving said cooperating electrical element; said frame, lever, electrical elements and screw all constituting a self-contained unitary structure adapted when removed from a specimen to be bodily movable as an assembled unit; recording means adapted to be mounted separately and independently of the testing machine and including a movable recorder member, power means supported independently of the specimen, means driven by said power means for moving said recorder member and said screw in synchronism including a flexible connection between said screw and the remainder of the synchronous connecting means thereby to transmit mechanically said synchronizing action to said threaded member, and means including an electrical circuit controlled by said electrical elements for controlling the power operation of said recording means.

RICHARD L. TEMPLIN.